(12) United States Patent
Higashino et al.

(10) Patent No.: US 6,433,456 B1
(45) Date of Patent: Aug. 13, 2002

(54) AUTOMOTIVE ALTERNATOR

(75) Inventors: Kyoko Higashino; Yoshihito Asao; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/699,395

(22) Filed: Oct. 31, 2000

(30) Foreign Application Priority Data

Feb. 24, 2000 (JP) ........................................ 2000-047781

(51) Int. Cl.[7] .............................................. H02K 15/00
(52) U.S. Cl. ........................ 310/263; 310/254; 310/180; 310/184
(58) Field of Search ................................ 310/180, 184, 310/254, 263

(56) References Cited

U.S. PATENT DOCUMENTS 4,692,645 A * 9/1987 Gotou ......................... 310/184
6,127,763 A * 10/2000 Nakamura et al. ........... 310/263
6,288,471 B1 * 9/2001 Kometani et al. ........... 310/254

FOREIGN PATENT DOCUMENTS

JP 4-26345 1/1992 .......... H02K/19/22

* cited by examiner

*Primary Examiner*—Burton S. Mullins
(74) *Attorney, Agent, or Firm*—Sughrue Mion, PLLC

(57) ABSTRACT

An automotive alternator reduces invalid magnetic fluxes and uncomfortable noises. In the automotive alternator, the number of slots is one per set of stator coils, per phase, and per pole. The stator coils are disposed such that two sets of three-phase coils have a phase difference from each other, and center-to-center intervals of circumferential gaps of adjoining slot openings are set to be nonuniform. Claw-shaped magnetic poles of the rotor are formed such that at least a narrow tooth of teeth formed between the slots of the opposing stator is positioned to overlap two of the claw-shaped magnetic poles that are adjacent in a direction of rotation of the rotor and have opposite polarities.

6 Claims, 10 Drawing Sheets

DIRECTION OF
ROTATION

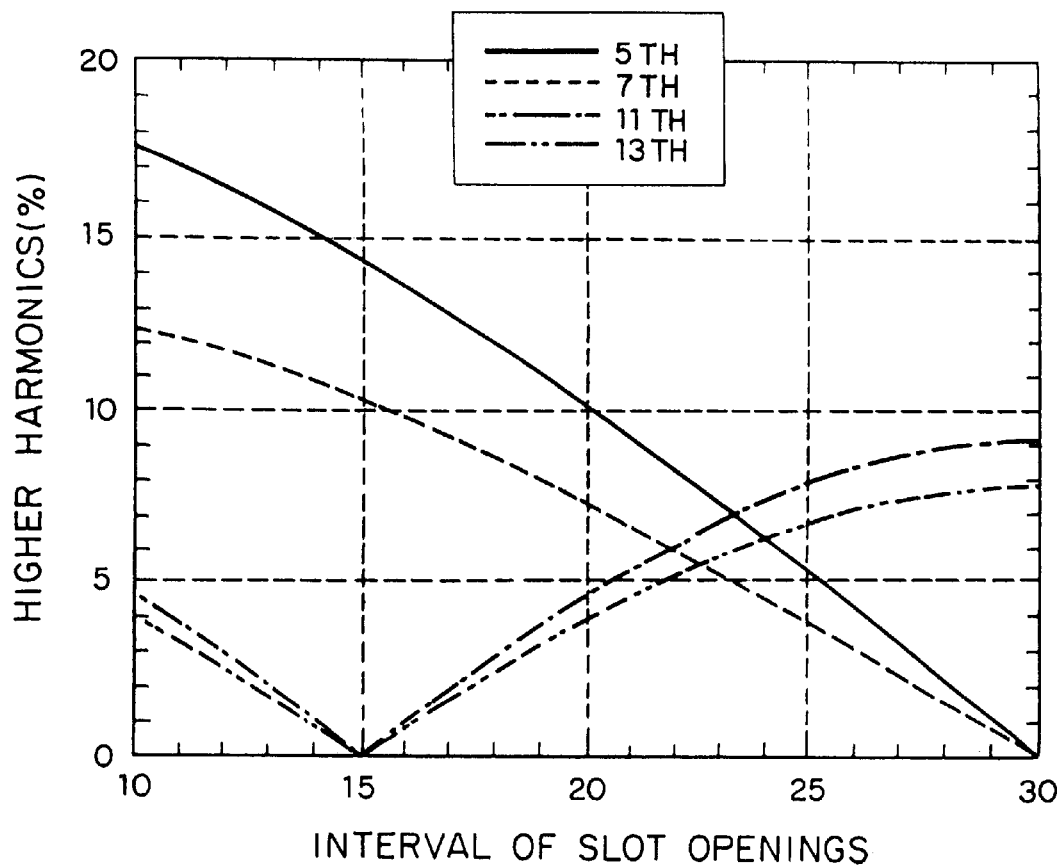

AUTOMOTIVE ALTERNATOR

BACKGROUND OF THE INVENTION

1. Field of the Invention

The present invention relates to an alternator driven by, for example, an internal combustion engine and, more particularly, to a structure of a stator of an automotive alternator mounted on a passenger car, a truck, etc.

2. Description of the Related Art

FIG. 8 is a sectional side elevation of a conventional automotive alternator, FIG. 9 is a perspective view of a rotor of FIG. 8, FIG. 10 is a front view of a stator core applied to a stator of the conventional automotive alternator, and FIG. 11 is a circuit diagram of the conventional automotive alternator. The conventional alternator shown in the drawings includes: a case 3 composed of an aluminum front bracket 1 and an aluminum rear bracket 2; a shaft 5 rotatably disposed in the case 3 and which has a pulley 4 secured to one end thereof; a Lundell-type rotor 6 secured to the shaft 5; fans 7 secured to both ends of the rotor 6; a stator 8 secured to an inner wall surface of the case 3; a slip ring 9 secured to the other end of the shaft 5 and which supplies electric current to the rotor 6; a brush 10 that slides in contact with the slip ring 9; a brush holder 11 accommodating the brush 10; a rectifier 12 electrically connected to the stator 8 to convert alternating current generated in the stator 8 into direct current; a heat sink 13 fitted on the brush holder 11; and a regulator 14 adhesively fastened to the heat sink 13 and which adjusts a magnitude of an alternating voltage generated in the stator 8.

The rotor 6 is equipped with a rotor coil 15 for generating magnetic fluxes by passing an electric current, and a pole core 16 covering the rotor coil 15 in which magnetic poles are produced by the magnetic fluxes. The pole core 16 has a pair of a first pole core assembly 17 and a second pole core assembly 18 that intermesh with each other. The first pole core assembly 17 and the second pole core assembly 18 are made of iron and have claw-shaped magnetic poles 19 and 20 at their ends. Spaces are formed between adjacent claw-shaped magnetic poles 19 and 20 to prevent magnetic fluxes from leaking from between the claw-shaped magnetic poles 19 and 20, and also to function as cooling passages for cooling the rotor coil 15.

The stator 8 is provided with a stator core 22 and two sets of three-phase stator coils 23 in which conductors are wound around the stator core 22 with a phase difference of a 30-degree electrical angle (see FIG. 10 and FIG. 11). The stator core 22 is formed by punching a steel sheet into a comb-like plate with equidistantly arranged teeth, and by rolling or laminating the comb-like plate into an annular shape. An inner periphery of the stator core 22 has slots 25 and teeth 24 that extend in the axial direction.

This example includes the two sets of the three-phase stator coils 23, and the rotor 6 has twelve magnetic poles, two three-phase portions corresponding to each pole. Seventy-two slots 25 and teeth 24, respectively, are formed. The annular stator core 22 has the slots 25 formed at equal intervals of 5-degree mechanical angles (360°/72). At this time, the seventy-two slots uniformly correspond to the a twelve poles, so that the slots 25 are formed at uniform intervals of 30-degree electrical angles. The two sets of three-phase stator coils 23 in Y-Y connection are respectively provided with a phase difference of a 30-degree electrical angle in the slots 25 and electrically connected to rectifiers 12.

In an automotive alternator having the above construction, current is supplied by a battery (not shown) through the brush 10 and a slip ring 9 to the rotor coil 15 so as to generate magnetic fluxes, whereby claw-shaped magnetic poles 19 of the first pole core assembly 17 are polarized with north-seeking (N) poles, while the claw-shaped magnetic poles 20 of the second pole core assembly 18 are polarized with south-seeking (S) poles.

The pulley 4 is rotated by an engine, and the rotor 6 rotates together with the shaft 5. This causes a rotating magnetic field to be imparted to the stator coil 23, and an electromotive force is generated. The AC electromotive force is converted into direct current by means of the rectifiers 12, and a magnitude of the direct current is adjusted by the regulator 14 before recharging the battery.

In the automotive alternator, one each of slots 25 of the stator core 22 is provided for each set and each phase of the stator coils 23 and for each magnetic pole of the rotor 6. Since there are seventy-two slots 25 and teeth 24, the circumferential widths of the teeth 24 are small; hence, there are fewer chances in which leakage magnetic fluxes produced between adjoining claw-shaped magnetic poles 19 and 20 of the rotor 6 leak out through the same teeth 24.

FIG. 12 illustrates a positional relationship between the teeth 24, the slots 25, and the claw-shaped magnetic poles 19 and 20. FIG. 12A shows a state wherein the teeth 24 overlap with only the claw-shaped magnetic pole 19, FIG. 12B shows a state wherein the teeth 24 overlap with the claw-shaped magnetic poles 19 and 20, and FIG. 12C shows a state wherein the teeth 24 overlap with only the claw-shaped magnetic pole 20. Thus, in the conventional automotive alternator, the teeth 24 have a narrow circumferential width, and the time during which magnetic fluxes leak to the teeth 24 is short. This means a less reduction in effective magnetic fluxes for the stator coils 23 caused by leakage magnetic fluxes, leading to reduced pulsation in magnetic fluxes. An art similar to that of the automotive alternator described above has been disclosed in Japanese Unexamined Patent Application Publication No. 4-26345.

In the conventional automotive alternator having the construction set forth above, if slot openings are arranged at equal intervals of 30-degree electrical angles, then spatial fifth and seventh higher harmonics of magnetic flux density waveforms do not appear. This is illustrated in FIG. 13 prepared by the inventors of the application concerned who have performed analyses of electromagnetic fields. Referring to FIG. 13, the axis of abscissa indicates the interval of slot openings. Electrical angles are at equal intervals at 30 degrees, while they are at nonuniform intervals at, for example, 24 degrees (24 degrees and 36 degrees are repeated). The axis of ordinates indicates a ratio of stator magnetomotive force higher harmonics to a fundamental wave. However, the magnetomotive force higher harmonics of the stator 8 have large spatial eleventh and thirteenth higher harmonics. Hence, if the magnetomotive force higher harmonics of the rotor 6 include the eleventh or thirteenth higher harmonics, then their mutual interference prevents adequate suppression of magnetic flux pulsation, so that fluctuation in a generated voltage cannot be adequately controlled. Thus, there has been a problem in that a magnetic attraction force is produced between the claw-shaped magnetic poles 19 and 20 of the rotor 6 and the stator 8, and resonance takes place in the stator 8, the case 3, etc. or the claw-shaped magnetic poles 19 and 20 of the rotor 6 vibrate, generating noises uncomfortable to an occupant.

Furthermore, if slots are disposed at equal pitches, Ad then marked synchronous pulsation based on the number of slots takes place, producing noises that are even more uncomfortable.

When the gap between adjoining claw-shaped magnetic poles 19 and 20 can be reduced, if the teeth 24 are made narrower accordingly, then a problem arises in that a main magnetic flux decreases although invalid magnetic fluxes can be reduced.

SUMMARY OF THE INVENTION

The present invention has been made with a view toward solving the problems described above, and it is an object of the present invention to provide an automotive alternator capable of reducing invalid magnetic fluxes and also reducing uncomfortable noises.

According to one aspect of the present invention, there is provided an automotive alternator comprising: a stator having a stator core in which a plurality of slots that open on an inner peripheral side and extend in an axial direction, and two or more sets of stator coils incorporated in the slots; and a rotor having a rotor coil rotatably provided inside the stator to generate magnetic fluxes by passing an electric current and a pole core which covers the coil and in which a plurality of claw-shaped magnetic poles are formed by the magnetic fluxes, the number of the slots per set, per phase, and per pole being one, the stator coils being disposed such that two sets of three-phase coils have a phase difference from each other, and center-to-center intervals of circumferential gaps of adjoining slot openings being nonuniform, wherein the claw-shaped magnetic poles of the rotor are formed such that at least a narrow tooth of teeth formed between the slots of the opposing stator is positioned to overlap two of the claw-shaped magnetic poles that are adjacent in a direction of rotation of the rotor and have opposite polarities.

In a preferred form of the present invention, the center-to-center intervals of the circumferential gaps of the adjoining slot openings are repeatedly set at electrical angles of α degrees and (60-α) degrees, the α degrees ranging from 16 degrees to 29 degrees.

In another preferred form of the present invention, the center-to-center intervals of the circumferential gaps of the adjoining slot openings are repeatedly set at electrical angles of α degrees and (60-α) degrees, the α degrees ranging from 22 degrees to 24 degrees.

In yet another preferred form of the present invention, each of the teeth that define the slots of the stator core has a jaw extending from a distal end portion thereof on at least one end in a circumferential direction, and the center-to-center intervals of the circumferential gaps of adjoining slot openings are set to be nonuniform based on an extending length of the jaw.

In still another preferred form of the present invention, the center-to-center intervals of circumferential gaps of the adjoining slot openings are set to be nonuniform based on circumferential widths of the teeth that define the slots of the stator core.

In a further preferred form of the present invention, the stator coils are three-phase stator coils of star connections, and neutral points of the star connections are electrically connected to the rectifiers for rectifying AC outputs.

BRIEF DESCRIPTION OF THE DRAWINGS

FIG. 13 is a diagram showing changes in higher harmonics of a stator magnetomotive force.

DESCRIPTION OF THE PREFERRED EMBODIMENTS

First Embodiment

Figure 1:
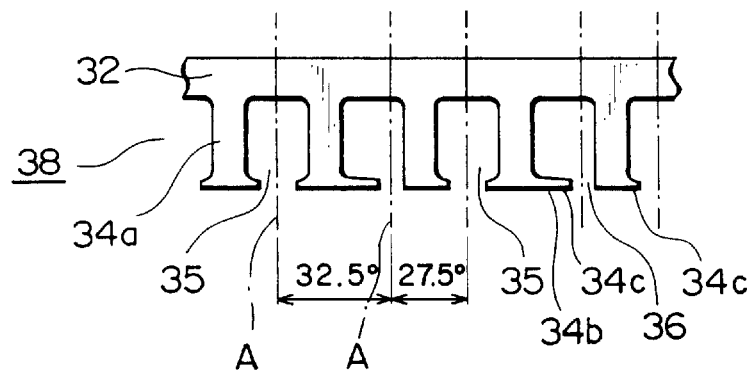
FIG. 1 is a schematic representation showing a stator core of an automotive alternator according to a first embodiment of the present invention.
Figure 2:
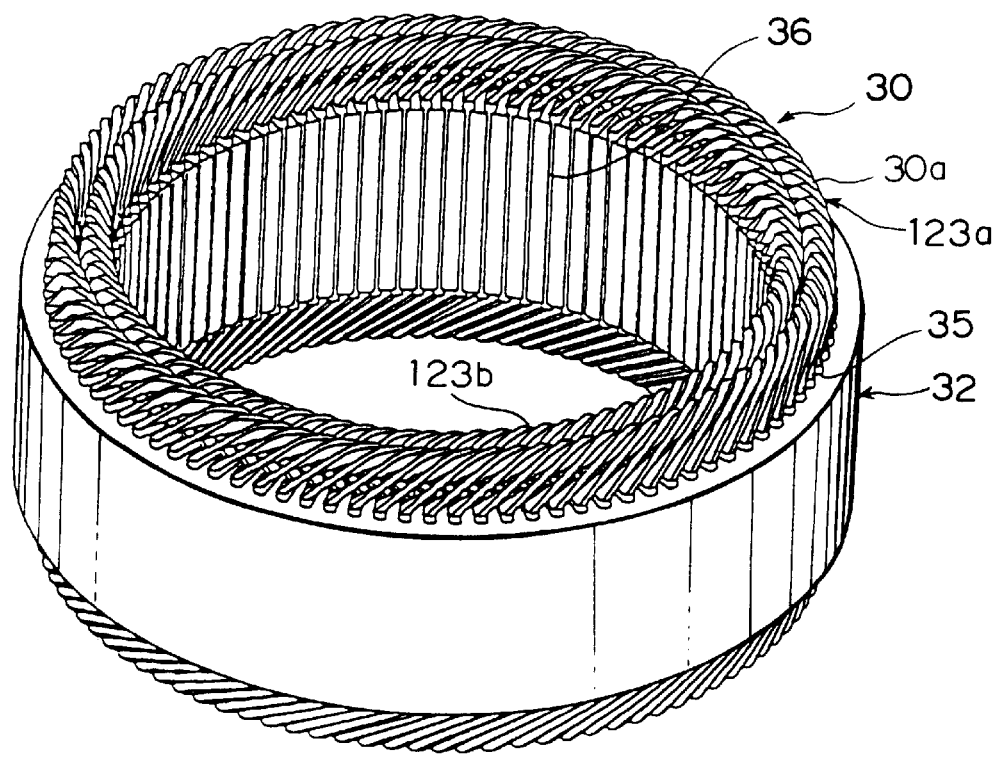
FIG. 2 is a perspective view showing a stator.
Figure 3:
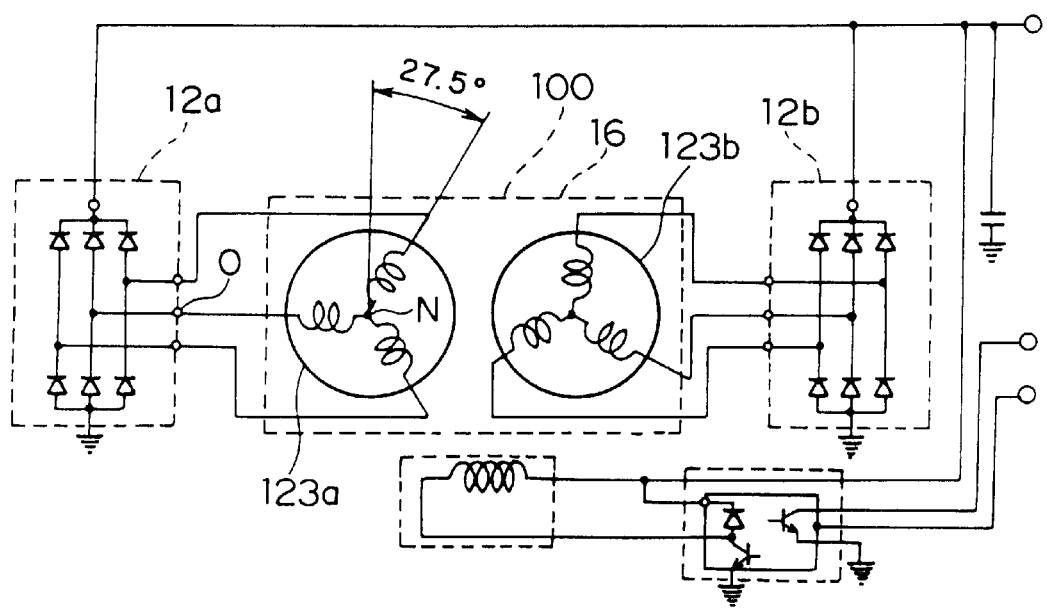
FIG. 3 is an electrical circuit diagram of the automotive alternator.
Figure 4A:
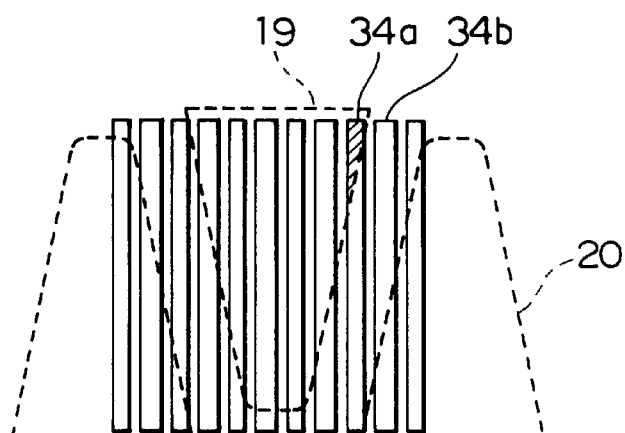
FIGS. 4A, 4B, 4C and 4D illustrate positional relationships between teeth, slots, and claw-shaped magnetic poles in accordance with the present invention.
Figure 4B:
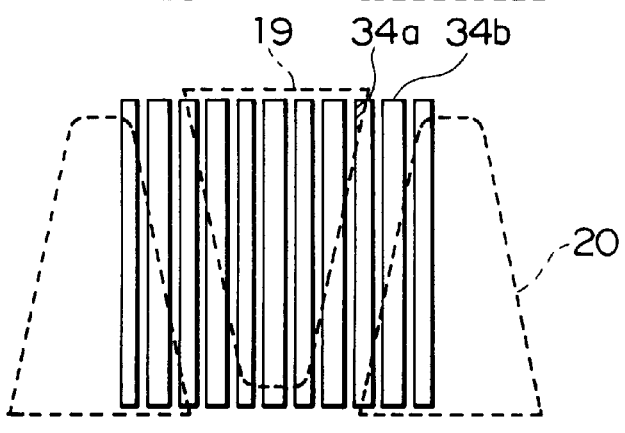
Figure 4C:
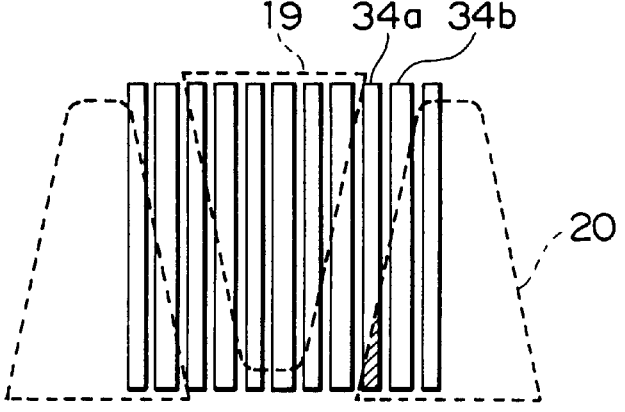
Figure 4D:
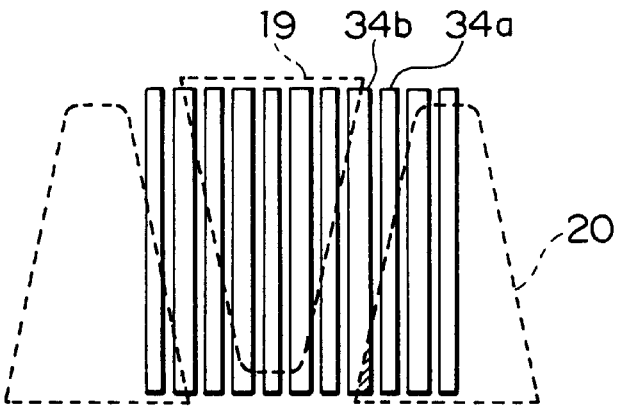

FIG. 1 is a schematic representation of a stator core 32 of a stator 100 of an automotive alternator according to a first embodiment of the present invention, the diagram being two-dimensional. FIG. 2 is a perspective view showing the stator 100. FIG. 3 is an electrical circuit diagram of the automotive alternator. Components identical or equivalent to the components of the conventional automotive alternator will be assigned the same reference numerals, and descriptions thereof will not be repeated.

The number of slots 35 of the stator core 32 is one per set, per phase, and per pole. More specifically, there are seventy-two slots 35; however, spaces between centerlines A extending in a radial direction of openings 36 of adjoining slots 35 are nonuniform, and an electrical angle (32.5 degrees –27.5 degrees) ×36 slots 35 are formed. A phase difference in electrical angle between a first three-phase stator coil 123*a* and a second three-phase stator coil 123*b* is 27.5 degrees rather than 30 degrees as in the conventional automotive alternator.

Each of the three-phase stator coils 123*a* and 123*b* has a plurality of windings wound such that a lengthy wire 30 is folded back outside the slots 35 at both end surface sides of the stator core 32 and threaded in the slots 35 through inner layers and outer layers alternately in a depth direction of the slots 35 at every predetermined number of slots. Turning portions 30*a* folded outside the slots 35 at both end surface sides of the stator core 32 constitute a group of coil ends arranged in a circumferential direction.

The first three-phase stator coil 123*a* and the second three-phase stator coil 123*b* have star connections, and neutral points N of the star connections are electrically connected to rectifiers 12*a* and 12*b* for rectifying AC outputs.

The first rectifier 12*a* for rectifying AC outputs from the first stator coil 123*a* is electrically connected to the first stator coil 123*a*. The second rectifier 12*b* for rectifying AC outputs from the second stator coil 123*b* is electrically connected to the second stator coil 123b. The outputs rectified by the two rectifiers are merged.

Figure 10:
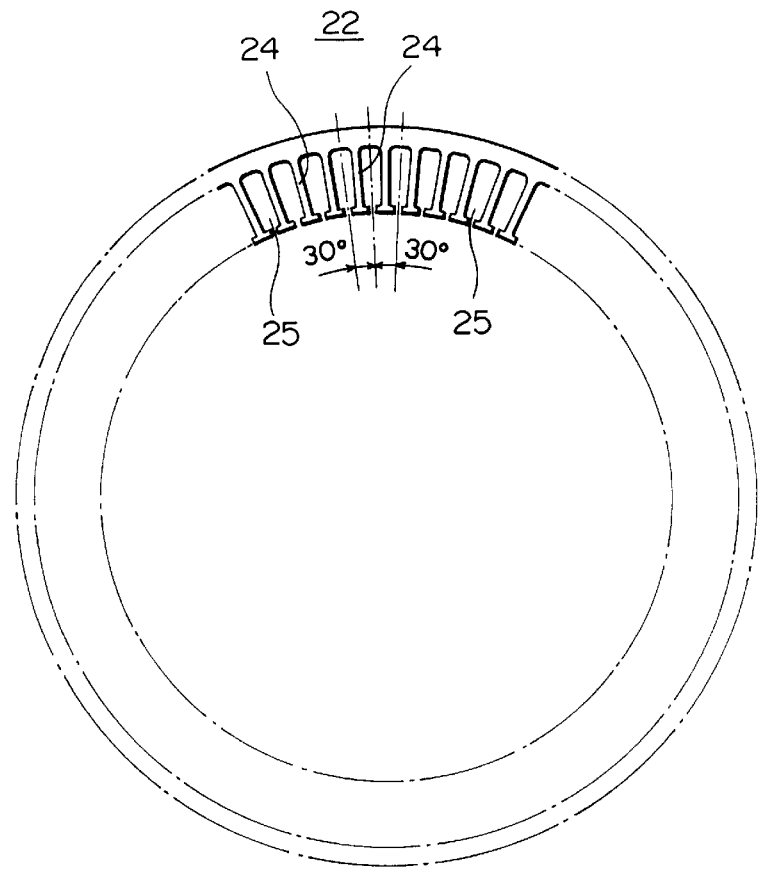
FIG. 10 is a front view of a stator core applied to a stator of the conventional automotive alternator.
Figure 11:
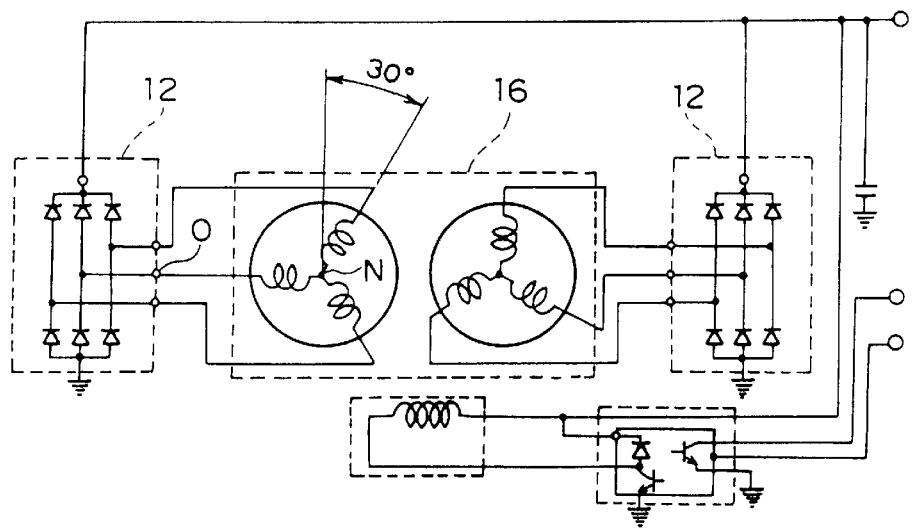
FIG. 11 is a circuit diagram of the conventional automotive alternator.
Figure 12A:
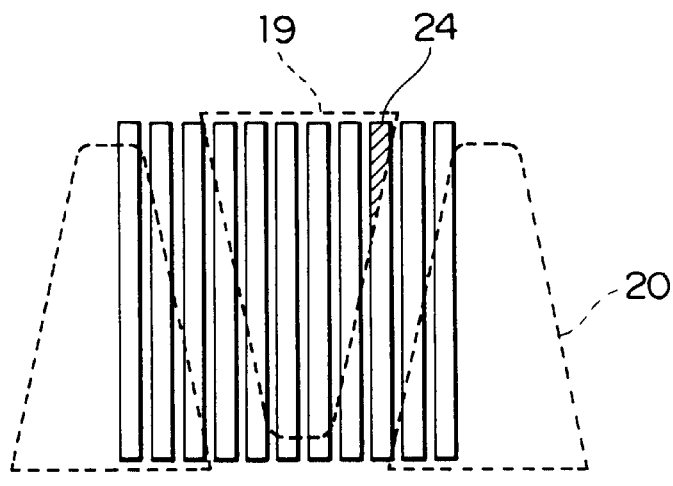
FIGS. 12A, 12B and 12C illustrate a positional relationship between teeth, slots, and claw-shaped magnetic poles of the conventional automotive alternator.
Figure 12B:
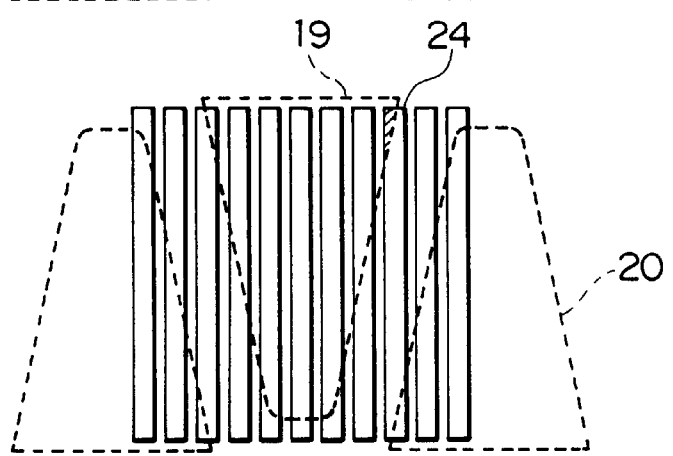
Figure 12C:
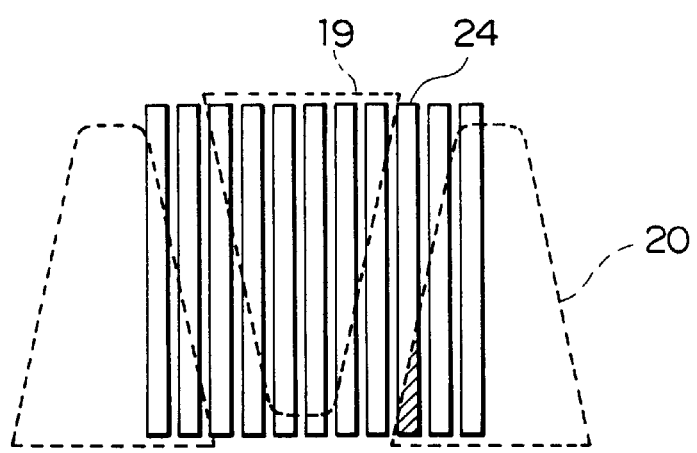

In this embodiment, a width of the main body of a tooth 34 and a distance to an adjoining tooth 34 are the same as those of the conventional stator core 22 shown in FIG. 10. This embodiment, however, is characterized in that a dimension between centerlines A that extend in the radial direction of openings 36 of the adjoining slots 35 is set to be uneven by adjusting a circumferential length of a jaw 34c at a distal end of the tooth 34. As a result, narrow teeth 34a and wide teeth 34b are alternately disposed in the circumferential direction.

It is not necessarily required to form the jaws 34c at the time of punching sheet metal. The jaws 34c may alternatively be formed by machining the distal ends of the teeth 34 after installing the three-phase stator coils 123a and 123b in the stator core 32. The stator core 32 may be formed by rolling and overlapping sheet metal or by laminating.

FIG. 4 illustrates positional relationships between the teeth 34, the slots 35, and the claw-shaped magnetic poles 19 and 20 in accordance with the embodiment. FIG. 4A illustrates a state wherein the narrow tooth 34a overlaps only the claw-shaped magnetic pole 19, FIG. 4B illustrates a state wherein the narrow tooth 34a overlaps the claw-shaped magnetic poles 19 and 20, FIG. 4C illustrates a state wherein the narrow tooth 34a overlaps only the claw-shaped magnetic pole 20, and FIG. 4D illustrates a state wherein the wide tooth 34b overlaps the claw-shaped magnetic poles 19 and 20. Thus, in this embodiment, the circumferential widths of the teeth 34a and 34b are made small as in the case of the conventional automotive alternator, and the time during which magnetic fluxes leak to the teeth 34a and 34b is short. Accordingly, as in the case of the conventional automotive alternator, a reduction in the effective magnetic fluxes for the stator coils 123a and 123b caused by leakage magnetic fluxes is small, allowing pulsation in magnetic fluxes to be controlled.

Furthermore, in the construction of the present embodiment, as observed from the rotor, the distal ends of the wide teeth 34a and the narrow teeth 34b alternately face the claw-shaped magnetic fields having the two opposite polarities. Therefore, as compared with the one having teeth of the same shape disposed at the same pitch, only half as many as teeth are required for the distal ends of teeth having different shapes to face the opposite polarities alternately, causing all fluctuations in generated voltages to be scattered. This means that the present embodiment is able to reduce invalid magnetic fluxes of and also to restrain fluctuations.

Unlike the conventional automotive alternator, however, center-to-center distances between the gaps of adjoining teeth 34a and 34b are set to 32.5 degrees and 27.5 degrees alternately in terms of electrical angle by the jaws 34c having different circumferential lengths. The two sets of the three-phase coils wound around the teeth will have a phase difference of 27.5 degrees. In the stator 38 having the construction, as shown in FIG. 13, the magnetomotive force higher harmonics of the stator 38 that represents a magnetic flux density waveform falls at the spatial eleventh and thirteenth higher harmonics, while it rises at the fifth and seventh magnetomotive force higher harmonics of the stator 38, as compared with the conventional case having the 30-degree electrical angle. Hence, uncomfortable noises can be reduced, and undulation of magnetic fluxes generated by the alternator is reduced, resulting in restrained voltage fluctuation.

In order to prevent noises uncomfortable to occupants from being produced, it is generally desirable to set a permissible upper limit value of the higher harmonics to approximately 13%. For this reason, satisfactory results can be usually obtained as long as the center-to-center distances or intervals of the circumferential gaps of the openings of the slots 35 are set to be uneven within a range from the one repeatedly alternates between 16 degrees and 44 degrees to the one repeatedly alternates between 29 degrees and 31 degrees.

The foregoing jaws 34c may be formed at the time of punching sheet metal, or formed by machining the distal ends of the teeth after the three-phase stator coils 123a and 123b are installed.

Figure 5:
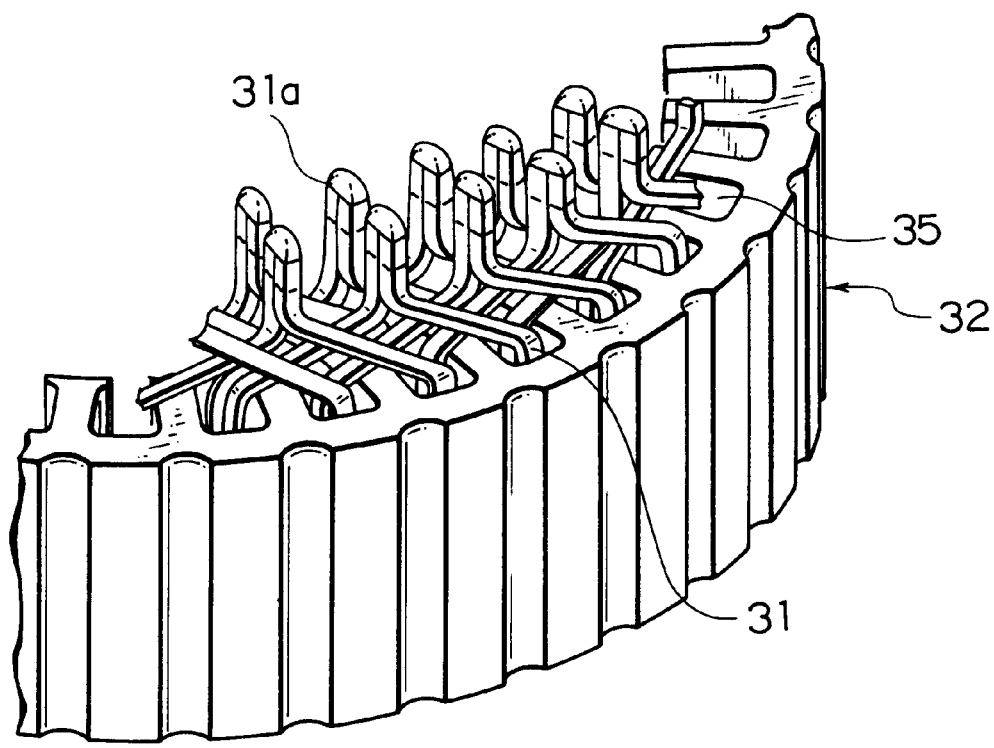
FIG. 5 is a perspective view showing a stator having another construction.

In the embodiment, the stator coils 123a and 123b have the lengthy wire 30 folded back outside the slots 35 and threaded in the slots 35 through inner layers and outer layers alternately in a depth direction of the slots 35 at every predetermined number of slots, as explained above; the present invention, however, is not limited thereto. As an alternative, as shown in FIG. 5, a plurality of substantially U-shaped short coil pieces 31 may be inserted from one axial end of the stator core 32, and coil piece ends 31a projected at the ends of the stator core 32 are connected at every predetermined number of coil pieces thereby to configure a sequential circuit.

The structure in which the stator coils 123a and 123b formed of the lengthy wire 30 folded back outside the slots 35 and threaded in the slots 35 through inner layers and outer layers alternately in a depth direction of the slots 35 at every predetermined number of slots are advantageous over the structure in which the substantially U-shaped short coil pieces 31 are inserted from one axial end of the stator core 32, and the coil piece ends 31a projected at the ends of the stator core 32 are connected. The advantage includes higher productivity and suppression of vibration of the stator 100 because of absence of welded places and also because of higher coil rigidity.

Second Embodiment

Figure 6:
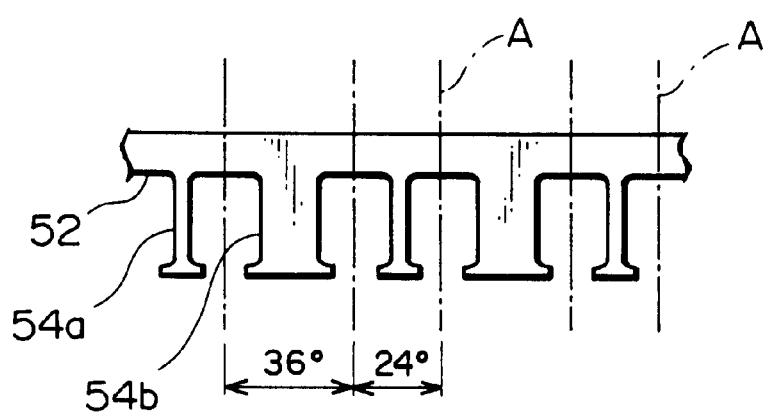
FIG. 6 is a schematic representation of a stator core of an automotive alternator according to a second embodiment of the present invention.

FIG. 6 is a schematic representation of a stator core 52 of an automotive alternator according to a second embodiment of the present invention, the diagram being two-dimensional.

This embodiment is the same as the first embodiment except that the widths of the main bodies of teeth 54a and 54b defining a plurality of slots are uneven and that the phase difference between two sets of three-phase coils is 24 degrees.

In the second embodiment, if magnetic fluxes passing through the narrow tooth 54a increase, then magnetic saturation is stimulated, whereas the magnetic saturation is eased in the adjoining wide tooth 54b, resulting in an increase in the output of the alternator.

The upper limit value of higher harmonics can be set to approximately 8% by setting the center-to-center distance or interval of the circumferential gaps of the openings of the slots 35 at nonuniform intervals within a range from the one repeatedly alternates between 22 degrees and 38 degrees to the one repeatedly alternates between 24 degrees and 36 degrees. Thus, the fifth, seventh, eleventh, and thirteenth higher harmonics can be reduced in good balance.

Third Embodiment

Figure 7:
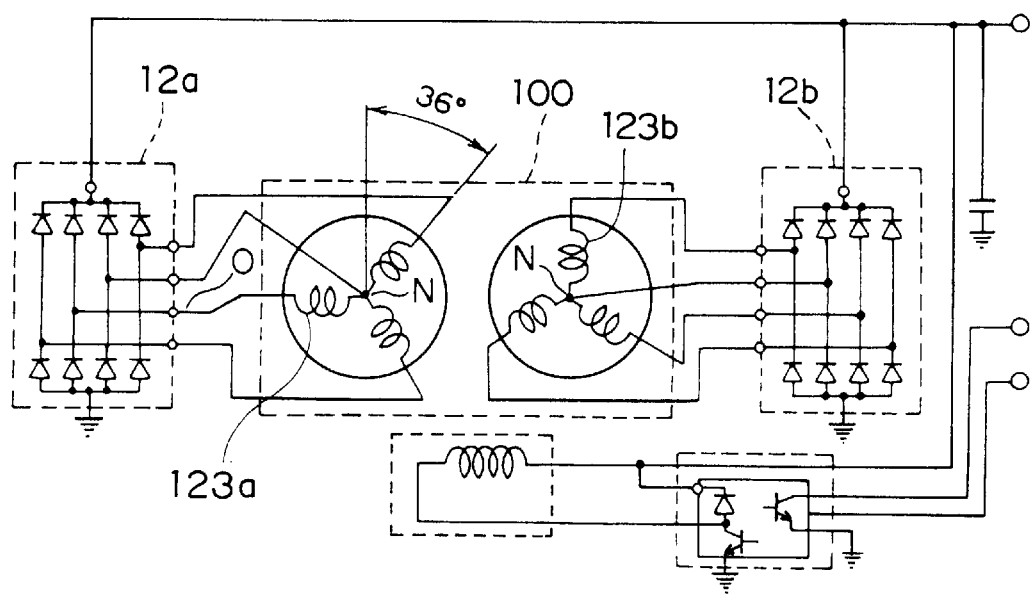
FIG. 7 is an electrical circuit diagram of an automotive alternator according to a third embodiment of the present invention.
Figure 8:
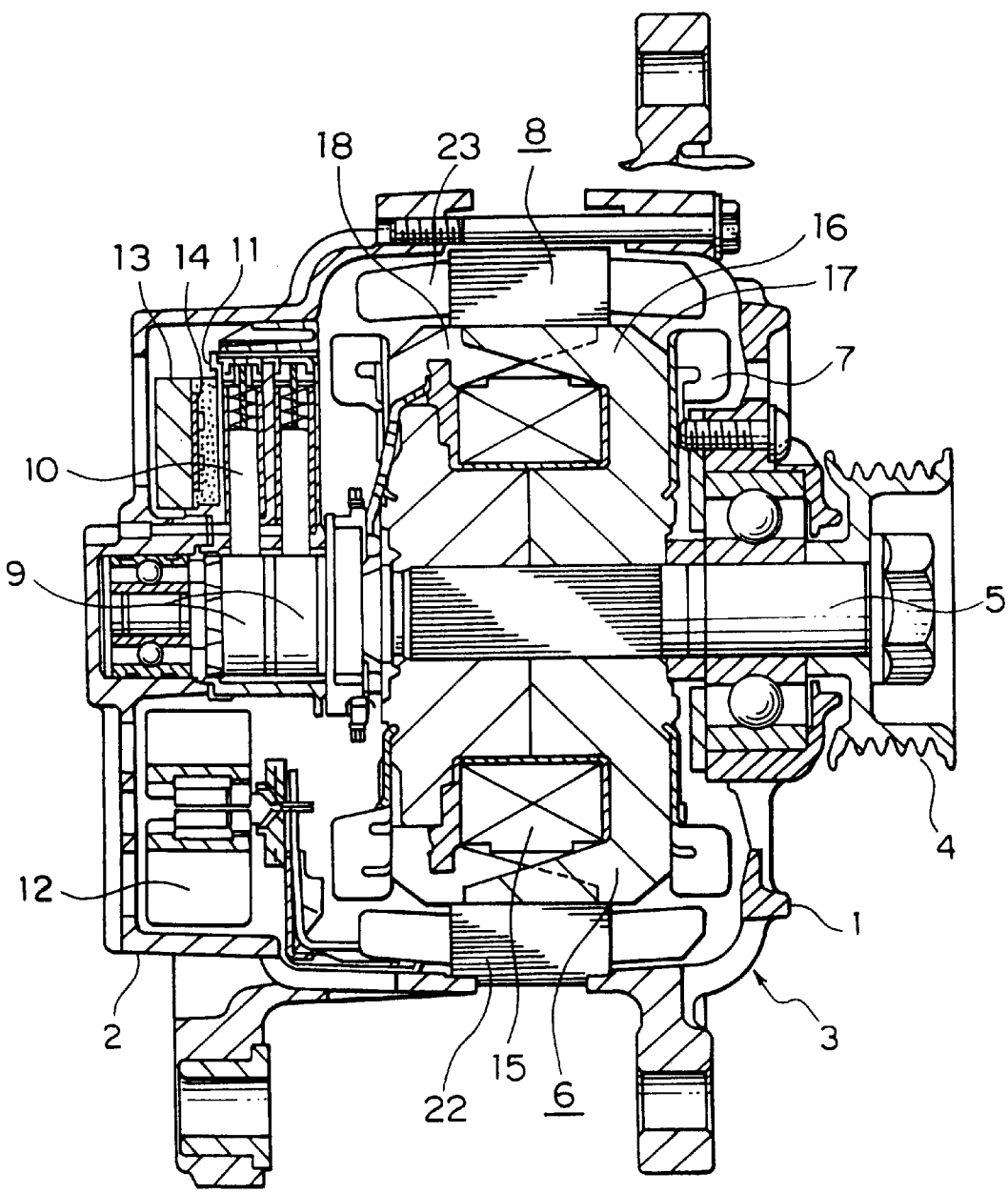
FIG. 8 is a sectional side elevation of a conventional automotive alternator.
Figure 9:
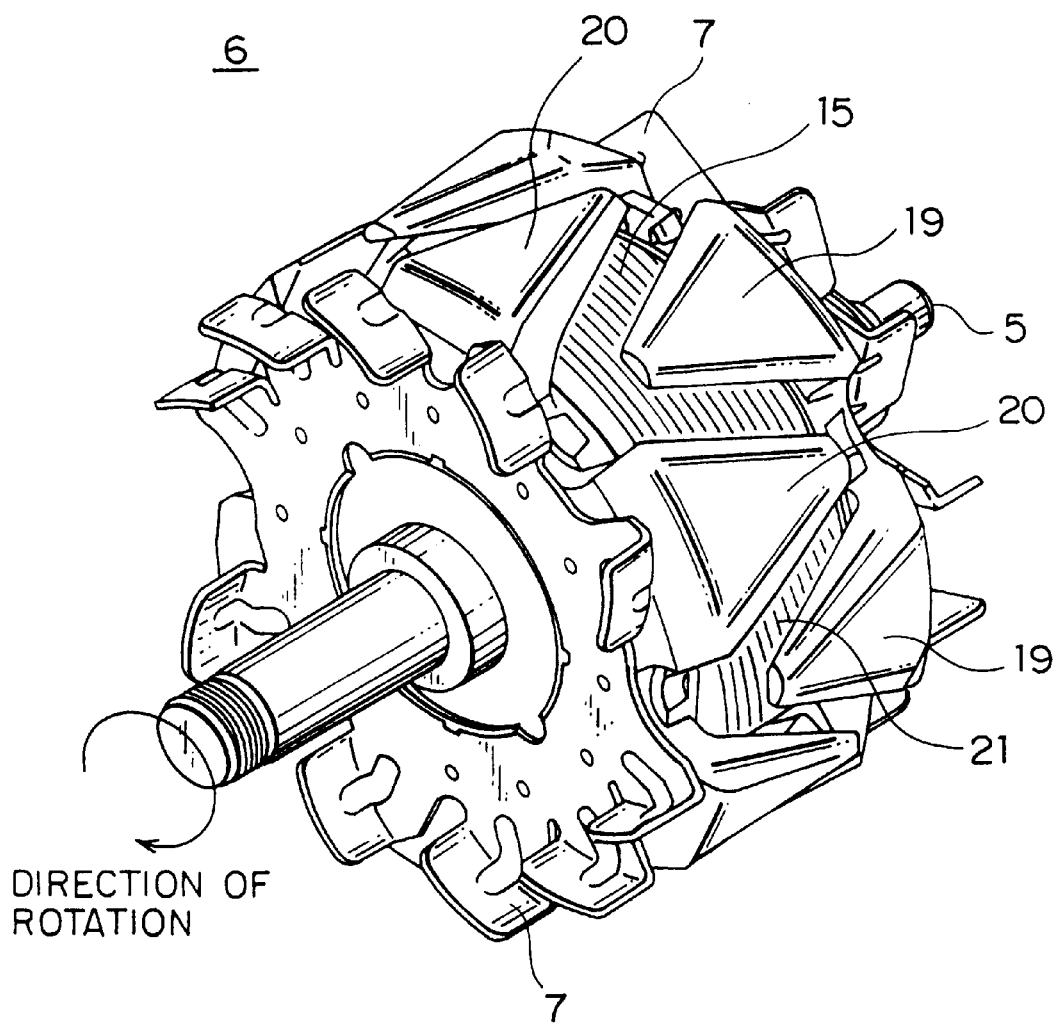
FIG. 9 is a perspective view of a rotor of FIG. 8.

FIG. 7 is an electrical circuit diagram of an automotive alternator according to a third embodiment of the present invention.

In this embodiment, neutral points N of three-phase stator coils 123a and 123b are electrically connected to rectifiers 12a and 12b, respectively. Therefore, when the alternator is running at high speed, outputs can be taken out from the neutral point voltages, allowing outputs to be improved.

The first rectifier 12a is electrically connected to the first stator coil 123a, and the second rectifier 12b is electrically connected to the second stator coil 123b, and the outputs rectified by the two rectifiers are merged. Hence, stable outputs can be obtained without affecting the outputs of the stator coils 123a and 123b. Although pulsation increases due to output currents from the neutral points, the uneven pitches restrain uncomfortable noises as in the case of the embodiment described above.

In the above embodiments, the descriptions have been given of the automotive alternator having a total of 72 slots and a total of 12 claw-shaped magnetic poles. It is obvious that the present invention can be also applied to an automotive alternator having a total of 96 slots and a total of 16 claw-shaped magnetic poles, or a total of 120 slots and a total of 20 claw-shaped magnetic poles. Furthermore, in the above embodiments, the field coils are included in the rotor. The present invention, however, can be also applied to an alternator that secures field coils to a bracket, and forms magnetic poles by supplying magnetic fluxes to a pole core of a rotor via an air gap. Moreover, the present invention is not limited to an automotive alternator.

Thus, the automotive alternator in accordance with the present invention includes: a stator having a stator core in which a plurality of slots that open on an inner peripheral side and extend in an axial direction and two or more sets of stator coils incorporated in the slots; and a rotor having a rotor coil rotatably provided inside the stator to generate magnetic fluxes on the passage of electric current and a pole core which covers the coil and in which a plurality of claw-shaped magnetic poles are formed by the magnetic fluxes, the number of the slots per set, per phase, and per pole being one, the stator coils being disposed such that two sets of three-phase coils are different from each other in phase, and center-to-center intervals of circumferential gaps of adjoining slot openings being set to be unequal, wherein the claw-shaped magnetic poles of the rotor are formed such that at least a narrow tooth formed between slots of an opposing stator is positioned to overlap two claw-shaped magnetic poles that are adjacent in a direction of rotation of the rotor and have opposite polarities. With this arrangement, even when the plurality of teeth formed in the circumferential direction include the teeth that are narrower in the circumferential direction because of the unequal circumferential widths, a state wherein a predetermined tooth overlaps adjoining claw-shaped magnetic poles is maintained, so that a magnetic flux density will not be decreased, permitting improved output efficiency proportional to the magnetic flux density. Moreover, as observed from the rotor, the distal ends of the wide and narrow teeth alternately face the claw-shaped magnetic fields having the two opposite polarities. Therefore, as compared with the one having teeth of the same shape arranged at the same pitch, only half as many teeth are required for the teeth having different shapes with their distal ends facing the opposite polarities alternately, causing all fluctuations in generated voltages to be scattered. This means that invalid magnetic fluxes are reduced and fluctuations can be restrained.

Furthermore, the center-to-center intervals of the circumferential gaps of adjoining slot openings are formed repeatedly at electrical angles of α degrees and (60-α) degrees, the α degrees ranging from 16 degrees to 29 degrees. With this arrangement, two sets of three-phase coils are formed, so that the electrical angles of the intervals of the centerlines that extend in the radial direction of the slot openings can be set to be nonuniform so that the three-phase coils have a phase difference from each other without changing interphase differences in each of the three-phase coils, that is, without causing a drop in output. This makes it possible to reduce order components of spatial magnetic flux higher harmonics attributable to electromagnetic noises.

The center-to-center intervals of the circumferential gaps of adjoining slot openings are formed repeatedly at electrical angles of α degrees and (60-α) degrees, the a degrees ranging from 22 degrees to 24 degrees. With this arrangement, the fifth, seventh, eleventh, and thirteenth higher harmonics can be reduced in good balance.

Each of the teeth that define slots of the stator core has a jaw extending from a distal end portion thereof on at least one end in a circumferential direction, and the center-to-center intervals of circumferential gaps of adjoining slot openings are set to be nonuniform based on an extending length of the jaw. Thus, the center-to-center intervals of the gaps of adjacent slot openings are adjusted by the length of the jaws, permitting easier adjustment of the intervals.

The center-to-center intervals of the circumferential gap of adjoining slot openings are set to be unequal based on circumferential widths of teeth that define the slots of the stator core. With this arrangement, since the circumferential widths of the teeth are unequal, if magnetic fluxes passing through the narrow teeth increase, then magnetic saturation is stimulated, whereas the magnetic saturation is eased in the adjoining wide teeth, resulting in an increased output.

The stator coil is a three-phase stator coil of star connection, and a neutral point of the star connection is electrically connected to a rectifier for rectifying an AC output. With this arrangement, when the alternator is running at high speed, outputs can be taken out from the neutral point voltages, allowing outputs to be improved.

What is claimed is:

1. An automotive alternator comprising:

a stator having a stator core, a plurality of slots open on an inner peripheral side of said core and extending in an axial direction, and two or more sets of stator coils incorporated in the slots, each of said slots being defined by a narrow tooth and a wide tooth next to each other extending in the axial direction; and a rotor having a rotor coil rotatably provided inside the stator to generate magnetic flux and a pole core which covers the coil and has a plurality of claw-shaped magnetic poles, the number of slots is nPø, where n is the number of sets of stator coils, P is the number of rotor poles, and ø is the number of phases of each set of stator coils, the stator coils being disposed such that two sets of three-phase coils have a phase difference from each other, and distances between adjacent centerlines extending in a radial direction of slot openings of the slots being nonuniform, wherein the claw-shaped magnetic poles of the rotor are formed such that there is a time at which the narrow tooth formed between the slots of the opposing stator is positioned to overlap two of the claw-shaped magnetic poles that are adjacent in a direction of rotation of the rotor and have opposite polarities as one of the magnetic poles moves past the narrow tooth and the next magnetic pole arrives.

2. An automotive alternator according to claim 1, wherein the distances between adjacent centerlines extending in a radial direction of slot openings of the slots define electrical angles alternating between α degrees and (60-α) degrees, where α ranges from 16 degrees to 29 degrees.

3. An automotive alternator according to claim 1, wherein the distances between adjacent centerlines extending in a radial direction of slot openings of the slots define electrical angles alternating between α degrees and (60-α) degrees, where α ranges from 22 degrees to 24 degrees.

4. An automotive alternator according to claim 1, wherein each of the teeth that define the slots of the stator core has a jaw extending from a distal end portion thereof on at least one end in a circumferential direction, and the distances between adjacent centerlines extending in a radial direction of slot openings of the slots are set to be nonuniform depending on an extending length of the jaw.

5. An automotive alternator according to claim 1, wherein the distances between adjacent centerlines extending in a radial direction of slot openings of the slots are set to be nonuniform depending on circumferential widths of the teeth that define the slots of the stator core.

6. An automotive alternator according to claim 1, wherein the stator coils are three-phase stator coils with star connections, and neutral points of the star connections are electrically connected to the rectifiers.

* * * * *